(12) United States Patent  
Schaffer

(10) Patent No.: US 7,051,352 B1  
(45) Date of Patent: May 23, 2006

(54) ADAPTIVE TV PROGRAM RECOMMENDER

(75) Inventor: J. David Schaffer, Wappingers Falls, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/498,271

(22) Filed: Feb. 4, 2000

(51) Int. Cl.
*H04N 7/16* (2006.01)
*H04N 5/445* (2006.01)

(52) U.S. Cl. .............................. 725/39; 725/9; 725/14; 725/46; 706/45

(58) Field of Classification Search ................ 725/38, 725/9–14, 44–47; 706/45; 705/10, 14
See application file for complete search history.

(56) References Cited

U.S. PATENT DOCUMENTS

| 4,706,121 | A | | 11/1987 | Young ........................ 358/142 |
| 5,410,344 | A | | 4/1995 | Graves et al. ................. 348/1 |
| 5,444,499 | A | | 8/1995 | Saitoh ........................ 348/734 |
| 5,534,911 | A | | 7/1996 | Levitan ........................ 348/1 |
| 5,585,865 | A | | 12/1996 | Amano et al. .............. 348/731 |
| 5,635,989 | A | | 6/1997 | Rothmiller ................. 348/563 |
| 5,704,017 | A | * | 12/1997 | Heckerman et al. .......... 706/12 |
| 5,758,257 | A | * | 5/1998 | Herz et al. ................... 725/116 |
| 5,758,259 | A | * | 5/1998 | Lawler ........................ 725/45 |
| 5,768,422 | A | * | 6/1998 | Yaeger ........................ 382/228 |
| 5,790,935 | A | * | 8/1998 | Payton ........................ 725/91 |
| 5,801,747 | A | * | 9/1998 | Bedard ........................ 725/46 |
| 5,828,419 | A | | 10/1998 | Bruettte et al. .............. 348/563 |
| 5,848,396 | A | * | 12/1998 | Gerace ........................ 705/10 |
| 5,867,226 | A | * | 2/1999 | Wehmeyer et al. ........... 725/46 |
| 5,867,799 | A | | 2/1999 | Lang et al. .................... 707/1 |
| 5,880,768 | A | | 3/1999 | Lemmons et al. ............. 348/1 |
| 5,987,415 | A | | 11/1999 | Breese et al. ............... 704/270 |
| 6,005,597 | A | * | 12/1999 | Barrett et al. ................. 725/46 |
| 6,317,722 | B1 | * | 11/2001 | Jacobi et al. ................. 705/14 |
| 6,412,012 | B1 | * | 6/2002 | Bieganski et al. .......... 709/232 |
| 6,637,029 | B1 | * | 10/2003 | Maissel et al. ............... 725/46 |
| 6,727,914 | B1 | * | 4/2004 | Gutta ......................... 715/719 |
| 6,871,186 | B1 | * | 3/2005 | Tuzhilin et al. ............... 705/26 |

FOREIGN PATENT DOCUMENTS

| EP | 0572090 | | 12/1993 |
| EP | 0669760 | | 8/1995 |
| EP | 0682452 | | 11/1995 |
| EP | 0721253 | | 7/1996 |
| EP | 0725539 | | 8/1996 |
| EP | 0735749 | | 10/1996 |
| EP | 0774866 | | 5/1997 |
| EP | 0836320 | | 4/1998 |
| EP | 0840504 | | 5/1998 |
| EP | 0854645 | | 7/1998 |
| FR | 2726718 | A1 * | 5/1996 |
| GB | 2289782 | | 11/1995 |

(Continued)

OTHER PUBLICATIONS

Billsus et al, "Learning Probabilistic User Models", http://www.dtki.de/~bauer/um-ws/Final-Versions/Billsus/ProbUserModels.html.

(Continued)

*Primary Examiner*—Chris Grant
*Assistant Examiner*—Son P. Huynh
(74) *Attorney, Agent, or Firm*—Edward W. Goodman

(57) ABSTRACT

A system for recommending television programs makes use of probabilistic calculations and a viewer profile to create a recommendation. The probabilistic calculations preferably are in the form of Bayesian classifier theory. Modifications to classical Bayesian classifier theory are proposed.

36 Claims, 4 Drawing Sheets

FOREIGN PATENT DOCUMENTS

| | | |
|---|---|---|
| GB | 2325537 | 11/1998 |
| WO | WO9413107 | 6/1994 |
| WO | WO9627840 | 9/1996 |
| WO | WO 9746006 A1 * | 12/1997 |
| WO | WO9748228 | 12/1997 |
| WO | WO9748230 | 12/1997 |
| WO | WO9821878 | 5/1998 |
| WO | WO9853609 | 11/1998 |
| WO | WO9856173 | 12/1998 |
| WO | WO9901984 | 1/1999 |

OTHER PUBLICATIONS

Breese et al., "Empirical Analysis of Predictive Algorithms for Collaborative Filtering", Proceedings of the Fourteenth Conference on Uncertainty in Artificial Intelligence, Madison, WI, Jul., 1998, Morgan Kaufmann Publisher.

Pazzani et al., "Learning and Revising User Profiles: The Identification of Interesting Web Sites", Machine Learning 27, pp. 313-331, 1997.

* cited by examiner

LET S BE ALL SHOWS NOT WATCHED IN THE 7 DAYS PRIOR TO
    AND INCLUDING THE CURRENT DAY.
LET N BE 1.

FOR EACH TV SHOW WATCHED
    ENTER THE WATCHED SHOW IN THE VIEWING HISTORY
    AS A POSITIVE EXAMPLE.
    SELECT A SUBSET S OF SHOWS NOT WATCHED
    SELECT AT RANDOM N SHOWS FROM SET S AND ENTER
    THEM IN THE VIEWING HISTORY AS NEGATIVE EXAMPLES.
    IF AN EXPLICIT VIEWER PROFILE IS AVAILABLE, THEN THE
    RANDOM SELECTION CAN BE BIASED AWAY FROM SHOWS
    "LIKED" AND TOWARDS SHOWS "NOT LIKED."

FIG. 3

| FIELD | DESCRIPTION |
|---|---|
| $DATE | YYYYMMDD |
| $AIR_TIME | HHMM (E.G. SOME VALUE IN THE RANGE 0000-2359) |
| $STATION_SIGN | 4 CHARACTERS (E.G. WABC) |
| $TITLE | 120 CHARACTERS (E.G. "ANTIQUES ROADSHOW") |
| $DESC | 120 CHARACTERS (E.G. "SKULLY VISITS ALIEN SPACECRAFT") |
| $GENRE | 20 CHARACTERS (E.G. "SCIENCE FICTION") |
| $ACTORS | 120 CHARACTERS (E.G. "JOHN DOE, JANE DOE") |
| $DIRECTORS | 120 CHARACTERS (E.G. "JOHN HITCHCOCK") |
| $HOSTS | 120 CHARACTERS (E.G. "JOHN HOST") |
| $PRODUCERS | 120 CHARACTERS (E.G. "JANE RICH, JOHN MONEYBAGS") |
| $WRITERS | 120 CHARACTERS (E.G. "JOHN POET") |

FIG. 4

| | | | | | | |
|---|---|---|---|---|---|---|
| TOTAL\|PROGRAMS | 55 | 55 | DESC\|LOCAL | 4 | 0 | |
| DAYTIME\|MON2100 | 5 | 0 | DESC\|NECESSARY | 6 | 0 | |
| DAYTIME\|MON2200 | 6 | 1 | DESC\|PRIMETIME | 5 | 0 | |
| DAYTIME\|TUE2200 | 4 | 1 | DESC\|PROGRAMMING | 4 | 0 | |
| DAYTIME\|WED2000 | 4 | 0 | TV RATING\|TV14 | 6 | 3 | |
| DAYTIME\|WED2200 | 6 | 0 | TV RATING\|TVG | 0 | 4 | |
| STATION\|WABC | 10 | 1 | SEX RATING\|N | 51 | 52 | |
| STATION\|WNBC | 30 | 0 | LANGUAGE RATING\|N | 51 | 50 | |
| STATION\|WNYW | 13 | 0 | ADVISORY\|ADULT SITUATIONS | 0 | 8 | |
| TITLE\|20/20 | 5 | 0 | ADVISORY\|LANGUAGE | 0 | 5 | |
| TITLE\|DATELINE NBC | 11 | 0 | MPAA RATING\|R | 0 | 4 | |
| TITLE\|MLB PLAYOFFS | 10 | 0 | STAR RATING\|**+ | 0 | 5 | |
| TITLE\|PAID PROGRAMMING | 0 | 5 | PROGRAM LANGUAGE\|ENGLISH | 51 | 52 | |
| GENRE\|ANIMATED | 0 | 4 | COUNTRY OF ORIGIN\|UNITED STATES | 0 | 7 | |
| GENRE\|BASEBALL | 13 | 1 | EPISODE TITLE\|GAME | 7 | 0 | |
| GENRE\|COMEDY | 4 | 8 | EPISODE TITLE\|LEAGUE | 4 | 0 | |
| GENRE\|FOOTBALL | 4 | 0 | EPISODE TITLE\|NEW | 5 | 0 | |
| GENRE\|MAGAZINE | 18 | 0 | EPISODE TITLE\|SERIES | 9 | 0 | |
| GENRE\|NEWS | 22 | 4 | | | | |
| GENRE\|REALITY | 4 | 1 | | | | |
| GENRE\|SITUATION | 3 | 5 | | | | |
| GENRE\|SPORTS EVENT | 15 | 2 | | | | |
| GENRE\|TALK | 18 | 3 | | | | |
| DESC\|ALLY | 6 | 0 | | | | |
| DESC\|IF | 6 | 0 | | | | |
| DESC\|MCBEAL | 4 | 0 | | | | |
| DESC\|ALTERNATE | 5 | 0 | | | | |
| DESC\|GAME | 4 | 0 | | | | |
| DESC\|LINEUP | 5 | 0 | | | | |

WHERE $$P(x) = P(x|C+)P(C+) + P(x|C-)P(C-)$$

$$P(x|C+) = \prod_{i=1}^{n} P(f_i|C+)^{x_i} (1-P(f_i|C+))^{1-x_i}$$

$n$ = number of features in profile
$f_i$ = the $i^{th}$ feature in the profile is a bit string of length n, where the $i^{th}$ bit indicates the
$x = \{0,1\}^n$ presence (1) or absence (0) of feature $f_i$ in the program

FIG. 6C

ADAPTIVE TV PROGRAM RECOMMENDER

BACKGROUND OF THE INVENTION

1. Field of the Invention

The invention relates to recommending television shows based on a user profile.

2. Description of the Related Art

U.S. Pat. No. 5,758,259 shows a method for identifying a preferred television program based on a "correlation" between the program and predetermined characteristics of a user profile. The term "correlation" as used in the patent does not appear to relate to the mathematical concept of correlation, but rather, is a very simple algorithm for assessing some similarity between a profile and a program.

SUMMARY OF THE INVENTION

It is an object of the invention to improve techniques of automatic program recommendation.

This object is achieved by using a probabilistic calculation, based on a viewer profile. The probabilistic calculation is preferably based on Bayesian classifier theory.

The object is further achieved by maintaining a local record of a viewer history. The local record is preferably incrementally updatable. The local record is advantageous for privacy reasons, and can be contrasted with methods, such as collaborative filtering, which would require viewer history information to be uploaded to a central location. The use of incremental updates is advantageous in minimizing storage requirements.

It is a still further object of the invention to improve the classical Bayesian classifier technique.

In one embodiment, this object is achieved by noise filtering.

In another embodiment, this object is achieved by applying a modified Bayesian classifier technique to non-independent feature values.

Further objects and advantages of the invention will be described in the following.

Bayesian classifiers are discussed, in general, in the textbook of Duda & Hart, "Pattern Recognition and Scene Analysis" (John Wiley & Sons 1973). An application of Bayesian classifiers to document retrieval is discussed in "Learning Probabilistic User Models", by D. Billsus & M. Pazzani.

BRIEF DESCRIPTION OF THE DRAWING

The invention will now be described by way of non-limiting example with reference to the following drawings, in which:

FIG. 3 shows pseudo code for a viewing history generator;

FIG. 4 shows a table of key fields;

FIG. 5 shows a viewer profile;

FIG. 6a shows a prior probability calculation;

FIG. 6b shows a conditional probability calculation; and

FIG. 6c shows a posterior probability calculation.

DETAILED DESCRIPTION OF THE PREFERRED EMBODIMENTS

Figure 1:
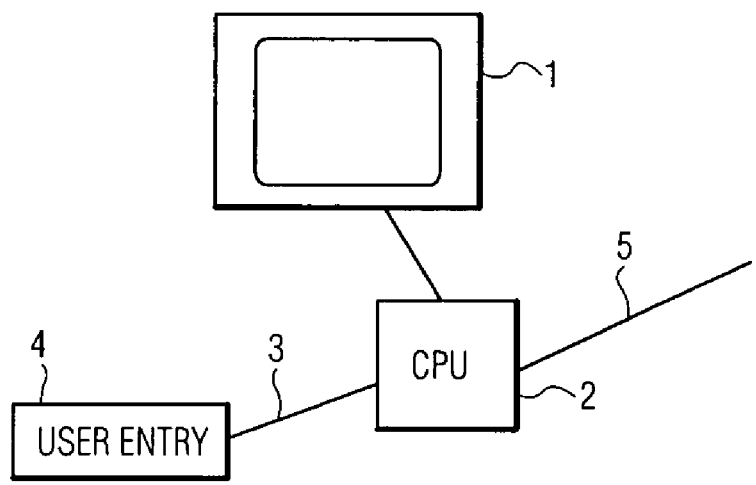
FIG. 1 shows a system on which the invention may be used.

FIG. 1 illustrates hardware for implementing the invention. The hardware includes a display 1, some type of processor 2, some type of user entry device 4 connected to the processor 2 via some type of connection 3, and some type of link 5 for receiving data, such as television programming or Electronic Programming Guide ("EPG") data. The display 1 is commonly a television screen, but could be any other type of display device. The processor 2 may be a set-top box, a PC, or any other type of data processing device, so long as it has sufficient processing power. The user entry device 4 may be a remote control unit and the connection 3 may be an infrared connection. If the processor is a PC, the user entry device will commonly be at least plural, e.g., a keyboard and mouse. The user entry device may also be touch sensitivity on the display. The connection 5 to the outside world could be an antenna, cable, a phone line to the Internet, a network connection, or any other data link. Equally well, connection 5 could connect to a memory device or several memory devices.

Figure 2:
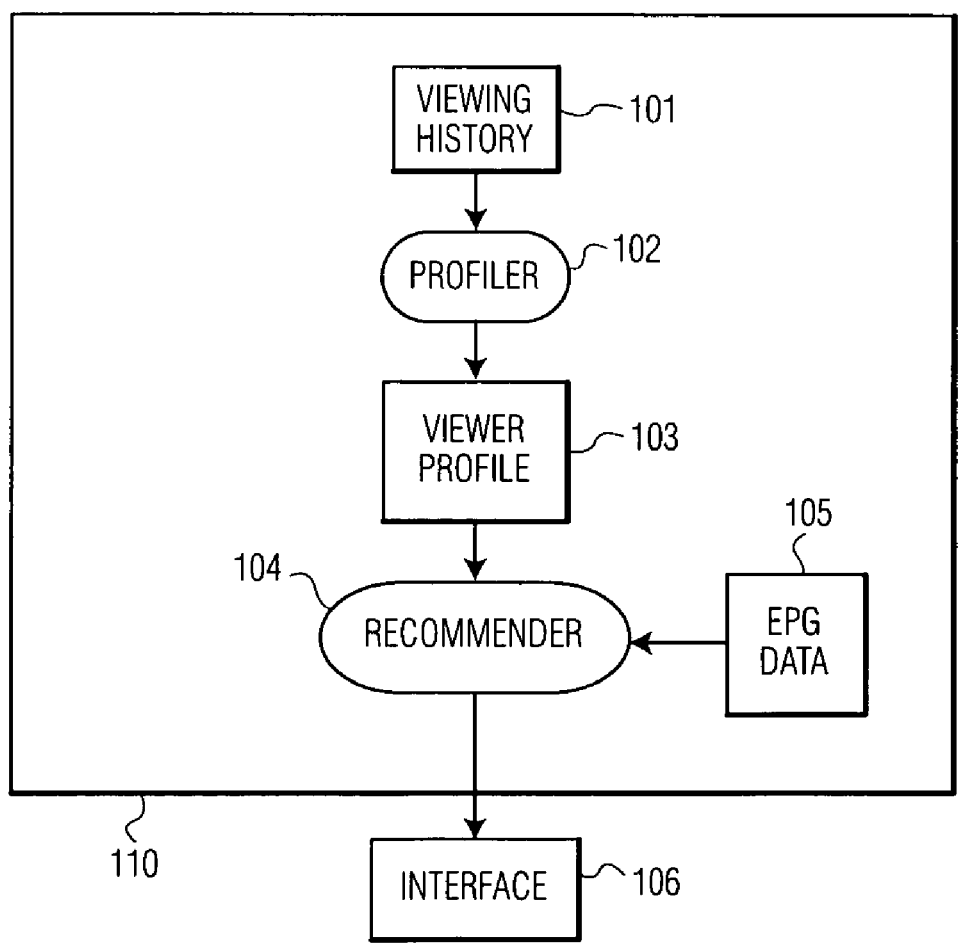
FIG. 2 shows major elements of an adaptive recommender.

FIG. 2 illustrates major elements of an embodiment of an adaptive recommender. These elements preferably reside as software and data in a medium 110 readable by a data processing device, such as CPU 2. The elements include a viewing history data structure 101 that gives input to profiler software 102. The profiler software, in turn, produces the viewer profile 103. The terms "user profile" and "viewer profile" shall be used interchangeably herein. The viewer profile serves as an input to recommender software 104. The recommender software also uses, as an input, the EPG data structure 105, that contains features describing each show, such as title, channel, start time and the like. An output of the recommender 104 appears on a user interface 106 where a user can interact with it.

The viewer history data structure includes selected records from the EPG database. EPG databases are commercially available, for instance, from Tribune Media Services. Those of ordinary skill in the art may devise other formats, possibly with finer shades of description. The selected records minimally correspond to TV shows watched by the viewer. It is assumed that these records have been deposited in the viewing history data structure 101 by software that is part of the user interface and knows what shows the viewer has viewed. Preferably, the software allows recording of a user watching more than one show in a given time interval, as users often switch back and forth during commercials, and so forth. Preferably, also, the software records a program as watched regardless of how long it was watched; and if a show was watched or whether it was taped for later viewing.

The preferred viewing history format assumes the presence of both positive and negative records in the viewing history. This is needed because the goal is to learn to differentiate between the features of shows that are liked and those not liked. FIG. 3 shows pseudo code for collecting the viewing history.

Let the notation C+ denote the set of positive (i.e., watched) shows and C− denote the negative (i.e., not watched) shows.

The viewer profile includes a number of feature value counts. These counts are incremented whenever new entries are deposited in the viewer history. Usually, each program has several feature values. Accordingly, the deposit of a program in the viewer history causes the update of counts associated with all feature values associated with that program.

The incremental updatability of this type of history is advantageous because it allows for ongoing adaptation of the viewer history without a large amount of storage or computing effort being required.

In addition to the count of the number of positive and negative entries (k(C+), k(C−)), a count of occurrences of individual features is also kept among the positive and negative examples (k(fi|C+), k(fi|C−)) where fi denotes feature i and k(fi|C+) denotes the number of shows in set C+ that possess feature fi. The feature set includes entries in the EPG records extracted from selected key fields, an example of which is shown in Table 1 which is FIG. 4.

A partial example of an embodiment of such counts is presented in Table 2, shown in FIG. 5 to illustrate the idea. The list as presented in FIG. 4 has six columns to save space, but, in fact, the list has only three columns, with the bottom part of Table 2 being presented next to the top part. Each row of Table 2 has four pieces of data, i.e., a feature type and a feature value in the first column, a positive count in the second column, and a negative count in the third column. The positive count indicates the number of times a program having that feature value has been watched. The negative count indicates the number of times a program having that feature value has not been watched.

A television program schedule normally includes several, if not many, programs for every time slot in every day. Normally, the user will only watch one or two of the programs in any given time slot. If the viewer profile contains a list of ALL the programs not watched, the number of programs not watched will far exceed the number of programs watched. It may be desirable to create a method for sampling the programs not watched. For instance, as the processor assembles the viewer profile, the processor may chose a single not-watched program at random from the weekly schedule as a companion for each watched program, as suggested in the pseudo-code of FIG. 3. This design will attempt to keep the number of positive and negative entries in the viewing history about equal so as not to unbalance the Bayesian prior probability estimates, discussed below.

It is not generally desirable to choose a companion program from the same time slot as a watched program. Experiment has shown that the combined time and day feature value is typically the strongest or one of the strongest predictors of whether a particular program will be preferred. Thus, another program at the same time as the watched program may well be a second or third choice program, while a program at a totally different time may be very undesirable. Accordingly, it is preferred to choose the companion program at random from the program schedule of the entire week that includes the watched program.

Since time and day feature values for a program are often so important in determining whether a program will be of interest to a user, it is typically undesirable to consider two programs of identical content to be the same if they are shown on different days and/or at different times. In other words, a particular episode of a series may be strongly preferred if it is shown at 8 p.m. on Tuesday, while the same episode of the same series may be completely undesirable if it is shown at 10 a.m. on Monday. Thus, the episode at 10 a.m. should be considered a different program from the episode at 8 p.m., even though the content of the two are identical.

As more and more shows are viewed, the length of the profile will tend to grow larger and larger. To combat this, and to keep the focus on features that are effective discriminators, the following are recommended:

periodic reviews of the features in the viewer profile, and removal of words that appear to be frequent and not very discriminating.

In general, those of simple tastes, e.g., those who only like to watch football, will be fairly easy to recommend for after taking of a viewer profile for a relatively short time. For those of more complex preferences, it will take longer for the viewer history to be sufficiently meaningful to make good recommendations. These latter people, however, are those who are probably most in need of a recommendation.

In the final analysis, viewer histories will always be ambiguous. Recommendations of shows based on such histories will always contain a margin for error. The recommendations can, at best, be said to have some probability of being correct. Therefore, probabilistic calculations are useful in analyzing viewer profile data to make recommendations.

The preferred embodiment of the recommender uses a simple Bayesian classifier using prior and conditional probability estimates derived from the viewer profile. How recommendations are shown to viewers is not defined here, yet it will be assumed that one can capture the viewer's response to them, at least observing whether or not they were watched.

Below, a 2-class Bayesian decision model is discussed. The two classes of TV shows of interest are:

C1—shows that interest the viewer
C2—shows that do not interest the viewer

Other classes might be used showing more shades of interest or lack thereof.

In contrast with the classes of interest listed above, viewing history obtains information only on the classes:

C+—shows the viewer watched
C−—shows the viewer did not watch

Determining which shows a user watched or did not watch is outside of the scope of this application. The user might enter a manual log of which shows he/she watched. Alternatively, hardware might record the user's watching behavior. Those of ordinary skill in the art might devise numerous techniques for this. It should be possible to consider shows as watched even if they are watched only for a short time, as a user may be switching back and forth between several shows, trying to keep track of all of them.

Inferences may be made about classes C1 and C2 based on observations, but these inferences will always contain an element of uncertainty. The Bayesian model will compute the prior probabilities P(C+) and P(C−) directly from the counts in the viewer profile in accordance with FIG. 6a. In other words, the assumption will be that shows not watched are those the viewer is not interested in, and that the shows watched are the ones that the viewer is interested in.

The conditional probabilities, that a given feature, fi, will be present if a show is in class C+ or C−, are then computed in accordance with FIG. 6b. These calculations can be performed once a day during times that the TV is not being viewed and stored in the viewer profile.

Recommendations for upcoming shows can be computed by estimating the posterior probabilities, i.e., the probability that a show is in class C+ and C− given its features. Let x be a binary vector (x1, x2, . . . , xi, . . . , xn) where i indexes over the features in the viewer profile, and where xi=1 if feature fi is present in the show being considered for recommendation, and 0 if not. For the exclusive features, like day, time, and station, where every show must have one and only one feature, the index i will be taken to indicate the value present in the show being considered, provided that this value is also present in the profile. Otherwise, novel exclusive features will not enter into the calculations. For non-exclusive features, the index i will range over all values present in the profile; non-exclusive features novel to the considered show will not contribute to the calculations. The posterior probabilities are estimated in accordance with FIG. 6c.

With these estimates in hand, a show will generally be recommended if P(C+|x)>P(C−|x) and the "strength" of the recommendation will be proportional to P(C+|x)−P(C−|x). One potential problem with this scheme is that some conditional probabilities are likely to be zero. Any zero in a chain multiplication will reduce the result to zero; hence, some means for eliminating zeros is needed. The Billsus and Pazzani article referenced above, presents a couple of schemes, including simply inserting a small constant for any zero that occur.

One method for dealing with zeroes in the conditional probability multiplication chain would be as follows. One can choose a heuristic of 1000. If the number of shows in the viewing history is less than 1000, then the value of 1/1000 can be substituted for zero. If the number of shows in the viewing history is greater than 1000, the correction can be $$\frac{k_i+ +1}{k+ +2}$$

Where $k_i+$ is the number of watched shows having feature I $k+$ is the total number of watched shows.

This is what is called the Laplace correction in the Billsus and Pazzani article. This Laplace correction must also be done for the not watched shows.

Alternative schemes may be devised by those of ordinary skill in the art.

Classical Bayesian theory would require the use of all accumulated elements of the list of FIG. 5 in making a recommendation. Nevertheless, in some instances, it may be useful to use a noise cutoff, eliminating features from consideration if insufficient data about them appears in the list. For instance, if a particularly feature did not appear in more than some given percentage of shows considered, whether in negative or in positive count, it might be ignored in determining which recommendation to make. Experimentally it was found that a cutoff of 5% was far too large.

Rather than use a percentage, one embodiment of the noise cutoff would use the viewer profile itself to determine the cutoff. This embodiment would first take a subset, or sub-list, of the viewer profile relating to particular feature types. For instance, a sub-list might advantageously comprise all of the elements of the viewer profile relating to the feature types, i.e., time of day and day of the week. Alternatively, in another example, the sub-list might advantageously comprise all of the elements of the viewer profile relating to channel number. Generally, the feature type or types chosen should be independent feature types, in other words, feature types which do not require another feature type to be meaningful.

The sub-list is then sorted by negative count, i.e., by number of shows having a particular feature value and not being watched. The highest negative count in this sorted list can be viewed as the noise level. In other words, since, in the preferred embodiment, the "not watched" shows are chosen at random from the week's program schedule, any not watched time slot can be considered to be noise.

Thus, any feature having both a positive and a negative count at or below the noise level need not be considered in the Bayesian calculation in making a recommendation. This example of noise level thresholding uses a particular feature, e.g., day/time as one for determining noise cutoff. In general, any feature that is uniformly randomly sampled by the negative example sampling procedure may be chosen by those of ordinary skill in the art for the calculation of the noise threshold.

The calculations of FIGS. 6a–6c are advantageous in that they require fairly low computing power to complete and are therefore readily adaptable to modest hardware, such as would be found in a set-top box.

"Surprise Me" Feature

Recommendations according to the above-described scheme will be programs having a preponderance of features that are present in shows that have been watched. The viewer profiles accumulated will not yield any meaningful recommendations with respect to shows having few features in common with watched shows. Accordingly, optionally, the recommender may occasionally recommend shows at random, in a "surprise me" feature, if such programs have relatively few features in common with watched shows.

Using the User Profile in Other Domains

Once a user profile is developed, the recommendation techniques of the invention might be used to recommend other types of items, such as movies, books, audio recordings, or even promotional materials, such as tee-shirts or posters.

Non-Independence of Features

The classical assumption in the domain of Bayesian classifier theory is that all features are independent. Therefore, if a features is, say, often present in positive shows, but is missing from a show being considered for recommendation, the fact should count against the show. However, this may yield undesirable results for the current application.

For example, let us assume that there are five day/time slots indicated in the user profile as being most watched. Let us assume further that a particular show being evaluated falls within one of those five slots. The calculation of FIG. 6c would then give rise to an increase in probability for the day/time slot that matches and a decrease for the four day/time slots that do not match. Intuitively, it appears that the latter decrease is not reasonably related to an accurate determination of probability for the show in question. The different values of day/time are not independent—as every show has one and only one value, so the values a show does not have should not count against it.

To remedy this deficiency in the classical Bayesian approach, it is proposed to designate features into two types: Set 1 and Set 2. If a feature is designated Set 1, the Bayesian calculation will ignore any non-matching values of the feature. If the feature is designated Set 2, then the normal Bayesian calculation, per FIG. 6c, will be done.

Normally in a television application, Set 1 would include day/time; station; and title. Some features which have values only for a few shows, e.g., critic ratings, should also be set 1, because too many shows would be non-matching merely because critics tend to rate only a tiny percentage of shows.

Set 2, for television shows, would normally include all features that can have several values per show, such as actor. From reading the present disclosure, other modifications will be apparent to persons skilled in the art. Such modifications may involve other features which are already known in the design, manufacture and use of television interfaces and which may be used instead of or in addition to features already described herein. Although claims have been formulated in this application to particular combinations of features, it should be understood that the scope of the disclosure of the present application also includes any novel feature or novel combination of features disclosed herein either explicitly or implicitly or any generalization thereof, whether or not it mitigates any or all of the same technical problems as does the present invention. Applicants hereby give notice that new claims may be formulated to such features during the prosecution of the present application or any further application derived therefrom.

The word "comprising", "comprise", or "comprises" as used herein should not be viewed as excluding additional elements. The singular article "a" or "an" as used herein should not be viewed as excluding a plurality of elements.

What is claimed is:

1. A data processing device comprising:
   at least one input for receiving data including
      viewer profile data; and
      data regarding a television program;
   a medium readable by the data processing device coupled to the input, said medium storing said viewer profile data; and
   a processor, the processor being adapted to perform the following:
      calculating a probability that the television program is a desired one; and
      supplying a recommendation regarding the television program based on the probability,
   wherein the processor maintains the viewer profile in accordance with a data structure comprising:
      a list of feature values; and
      for each element of the list, a respective number of times programs having that feature value were watched, and a respective number of times programs having that feature value were not watched,
   and wherein the processor is further arranged to perform the following, each time a user watches a new program,
      first adding, to the list, feature values or counts of such feature values, associated with that new program;
      selecting at least one companion program to the new program, the companion program being selected at random from a program schedule, which companion program has not been watched; and
      second adding, to the list, feature values of the companion program, or counts of such feature values.

2. The data processing device of claim 1, wherein the processor is further arranged to perform the following, each time a user watches a new program: first adding, to the list, feature values or counts of such feature values, associated with that new program.

3. The data processing device of claim 1, wherein the input is a network connection.

4. The data processing device of claim 1, wherein calculating comprises using a Bayesian classifier.

5. The data processing device of claim 4, wherein the processor is further adapted to subject the viewer profile to a noise threshold calculation prior to using the Bayesian classifier.

6. A data processing device comprising:
   at least one input for receiving data including
      viewer profile data; and
      data regarding a television program; and
   a processor, the processor being adapted to perform the following:
      calculating, using a Bayesian classifier, a probability that the television program is a desired one; and
      supplying a recommendation regarding the television program based on the probability,
   wherein the processor is further adapted to subject the viewer profile to a noise threshold calculation prior to using the Bayesian classifier,
   and wherein
      the viewer profile data comprises
      a list of feature values;
      a respective negative count for each element of the list, the negative count indicating a number of times programs having that feature value have not been watched;
      a respective positive count for each element of the list, the positive count indicating a number of times programs having that feature value have been watched;
      the noise threshold calculation comprises
         selecting a sub-list comprising at least feature values having at least one specific type of feature;
         choosing the highest negative count in the sub-list as the noise threshold;
      the recommendation comprises a program selected from a group having at least one feature value having a positive or negative count in the viewer profile, which count exceeds the noise threshold.

7. The data processing device of claim 6, wherein the specific type comprises a day and time of day feature type.

8. The data processing device of claim 6, wherein the specific type comprises a station identification feature type.

9. The data processing device of claim 6, wherein the viewer profile data comprises a plurality of respective counts of programs watched, each respective count indicating how many programs watched had a respective feature.

10. The data processing device of claim 9, wherein calculating comprises calculating a probability that the television program is in a particular class.

11. The data processing device of claim 10, wherein the class is one of
   programs the viewer is interested in, and
   programs the viewer is not interested in.

12. A data processing device comprising:
   at least one input for receiving data including
      viewer profile data; and
      data regarding a television program; and
   a processor, the processor being adapted to perform the following:
      calculating, using a Bayesian classifier, a probability that the television program is a desired one; and
      supplying a recommendation regarding the television program based on the probability,
   wherein the processor is further adapted to subject the viewer profile to a noise threshold calculation prior to using the Bayesian classifier,
   and wherein subjecting the viewer profile to the noise threshold further comprises using observations gathered by a known random process to estimate a reasonable noise threshold.

13. A data processing device comprising:
   at least one input for receiving data including
      viewer profile data; and
      data regarding a television program; and
   a processor, the processor being adapted to perform the following:

calculating a probability that the television program is a desired one; and supplying a recommendation regarding the television program based on the probability, wherein calculating the probability comprises:

computing a prior possibility, of whether a program is desired or not;

computing a conditional probability of whether a feature fi will be present if a show is desired or not; and computing a posterior probability of whether program is desired or not, based on the conditional probability and the prior probability.

14. The data processing device of claim 13, wherein it is assumed that programs watched are programs that the viewer is interested in.

15. The data processing device of claim 13, wherein the processor is further adapted to provide a recommendation regarding an additional item, other than a television program, based on the viewer profile.

16. A data processing device comprising:

at least one input for receiving data including
viewer profile data; and
data regarding a television program; and a processor, the processor being adapted to perform the following:

calculating a probability that the television program is a desired one; and supplying a recommendation regarding the television program based on the probability, wherein the viewer profile comprises a list of features types and values for such feature types;

the feature types are selected from at least two sets, including a first set of feature types whose values are deemed non-independent; and a second set of feature types whose values are deemed independent; and calculating a probability comprises applying a Bayesian classifier calculation corresponding to feature types from the second set; and applying a modified Bayesian classifier calculation corresponding to feature types from the first set.

17. The data processing device of claim 16, wherein with respect to features of the first set, the modified Bayesian classifier calculation considers only feature values that match with a show being classified.

18. A computer readable medium having computer-executable instructions stored thereon for performing the method comprising:

calculating a probability that a television program is a desired one, based on a viewer profile and data regarding the television program; and supplying a recommendation regarding the television program based on the probability, wherein the computer readable medium further embodies the viewer profile, the viewer profile being embodied as a data structure comprising:

a list of feature values; and for each element of the list, a respective number of times programs having that feature value were watched, and wherein the software is further arranged to perform the following, each time a user watches a new program, first adding, to the list, feature values or counts of such feature values, associated with that new program;

selecting at least one companion program to the new program, the companion program being selected at random from a program schedule, which companion program has not been watched; and second adding, to the list, feature values of the companion program, or counts of such feature values.

19. The computer readable medium of claim 18, wherein the computer-executable instructions is further arranged to perform the following, each time a user watches a new program: first adding, to the list, feature values or counts of such feature values, associated with that new program.

20. The computer readable medium of claim 18, wherein the computer readable medium embodies the data regarding the television program.

21. The computer readable medium of claim 18, wherein calculating comprises using a Bayesian classifier.

22. The computer readable medium of claim 21, wherein the computer-executable instructions, is further adapted to subject the viewer profile to a noise threshold calculation prior to using the Bayesian classifier.

23. A computer readable medium having computer-executable instructions stored thereon for performing the method comprising:

calculating, using a Bayesian classifier, a probability that a television program is a desired one, based on a viewer profile and data regarding the television program; and supplying a recommendation regarding the television program based on the probability, wherein the computer-executable instructions is further adapted to subject the viewer profile to a noise threshold calculation prior to using the Bayesian classifier, and wherein the viewer profile data comprises a list of feature values;

a respective negative count for each element of the list, the negative count indicating a number of times programs having that feature value have not been watched;

a respective positive count for each element of the list, the positive count indicating a number of times programs having that feature value have been watched;

the noise threshold calculation comprises selecting a sub-list comprising at least feature values having at least one specific type of feature;

choosing the highest negative count in the sub-list as the noise threshold;

the recommendation comprises a program selected from a group having at least one feature value having a positive or negative count in the viewer profile exceeding the noise threshold.

24. The computer readable medium of claim 23, wherein the specific type comprises a day and time of day feature type.

25. The computer readable medium of claim 23, wherein the specific type comprises a station identification feature type.

26. The computer readable medium of claim 23, wherein the viewer profile data comprises a plurality of respective counts of programs watched, each respective count indicating how many programs watched had a respective feature.

27. The computer readable medium of claim 26, wherein calculating comprises calculating a probability that the television program is in a particular class.

28. The computer readable medium of claim 26, wherein the class comprises at least one of programs the viewer is interested in and programs the viewer is not interested in.

29. A computer readable medium having computer-executable instructions stored thereon for performing the method comprising:

calculating, using a Bayesian classifier, a probability that a television program is a desired one, based on a viewer profile and data regarding the television program; and supplying a recommendation regarding the television program based on the probability, wherein the computer-executable instructions is further adapted to subject the viewer profile to a noise threshold calculation prior to using the Bayesian classifier, and wherein subjecting the viewer profile to the noise threshold further comprises using observations gathered by a known random process to estimate a reasonable noise threshold.

30. A computer readable medium having computer-executable instructions stored thereon for performing the method comprising:

calculating a probability that a television program is a desired one, based on a viewer profile and data regarding the television program; and supplying a recommendation regarding the television program based on the probability, wherein calculating the probability comprises:

computing a prior possibility, of whether a program is desired or not;

computing a conditional probability of whether a feature fi will be present if a show is desired; and computing a posterior probability of whether program is desired or not, based on the conditional probability and the prior probability.

31. The computer readable medium of claim 30, wherein it is assumed that programs watched are programs that the viewer is interested in.

32. The computer readable medium of claim 30, wherein the computer-executable instructions is further arranged to provide a recommendation regarding an additional item, other than a television program, based on the viewer profile.

33. A computer readable medium having computer-executable instructions stored thereon for performing the method comprising:

calculating a probability that a television program is a desired one, based on a viewer profile and data regarding the television program; and supplying a recommendation regarding the television program based on the probability, wherein the viewer profile comprises a list of features types and values for such feature types;

the feature types are selected from at least two sets, including a first set of feature types whose values are deemed non-independent; and a second set of feature types whose values are deemed independent; and calculating a probability comprises applying a Bayesian classifier calculation corresponding to feature types from the second set; and applying a modified Bayesian classifier calculation corresponding to feature types from the first set.

34. The computer readable medium of claim 33, wherein with respect to features of the first set, the modified Bayesian classifier calculation considers only values that match with a show being classified.

35. A data processing method comprising performing the following operations in a data processing device:

first receiving data reflecting physical observations, which data includes a list of feature values and observations about feature values, some of which feature values are independent and some of which are not;

second receiving data about an item to be classified, the data about the item to be classified including feature values;

maintaining a division of the data reflecting physical observations into at least two sets, including a first set including those feature values which are deemed not independent; and a second set including those feature values which are deemed independent;

performing a probabilistic calculation on the data reflecting physical observations and the data regarding an item to be classified including:

applying a Bayesian classifier calculation with respect to feature values relating to the second set; and applying a modified Bayesian classifier calculation with respect to feature values relating to the first set presenting a conclusion regarding the item to be classified to a user based on the probabilistic calculation.

36. The method of claim 35, wherein the modified Bayesian classifier calculation comprises ignoring feature values from the data reflecting physical observations when those feature values are not present in the data regarding the item to be classified.

* * * * *